United States Patent [19]

Friedland et al.

[11] Patent Number: 4,729,243
[45] Date of Patent: Mar. 8, 1988

[54] MASS-FLOW MEASURING INSTRUMENT

[75] Inventors: Bernard Friedland, West Orange; Douglas E. Williams, Bloomfield, both of N.J.; Irwin I. Sterman, Spring Valley, N.Y.

[73] Assignee: The Singer Company, Stamford, Conn.

[21] Appl. No.: 859,360

[22] Filed: May 5, 1986

[51] Int. Cl.$^4$ .............................................. G01F 1/84
[52] U.S. Cl. ................................................. 73/861.38
[58] Field of Search ......................... 73/861.37, 861.38

[56] References Cited

U.S. PATENT DOCUMENTS 4,491,025 1/1985 Smith .............................. 73/861.38

Primary Examiner—Herbert Goldstein
Attorney, Agent, or Firm—David L. Davis

[57] ABSTRACT

A device to measure the mass-flow rate of a fluid from the Coriolis force resulting from the flow of the fluid through the device during oscillation. The device comprises four U-shaped tubes wherein the phase and direction of flow in these tubes are arranged so as to cancel the errors due to motion of the instrument base.

18 Claims, 10 Drawing Figures

MASS-FLOW MEASURING INSTRUMENT

TECHNICAL FIELD

This invention relates generally to a device to measure the true mass flow rate of a fluid. In particular, the device measures the mass flow rate of a fluid from the Coriolis force resulting from the flow of fluid through the device during oscillation thereof.

BACKGROUND OF THE INVENTION

There are many instruments available for measuring the volume flow rate of a fluid (in liters/sec, for example). But for many applications, such as jet engine control, it is necessary to have an instrument which can accurately measure the mass flow rate (in Kg/sec, for example). The volume flow rate can be converted to mass flow rate if the density (in Kg/liter, for example) of the fluid is known. However, the density of the fluid depends on the temperature of the fluid and its composition which are often not known with the accuracy required to convert volume flow rate to mass flow rate.

U.S. Pat. No. 3,132,512 ("Roth") describes a gyroscopic mass flowmeter that operates on the principle of Coriolis forces and, in theory, is capable of measuring true mass flow rate. The mass flowmeter is basically a circular tube that is excited to vibrate in a direction normal to the plane in which it is at rest. The fluid whose mass flow rate is to be measured is made to flow through the tube. The Coriolis force on the tube resulting from the combined fluid flow and vibration causes the tube to twist. For a given geometry and vibration, the angle of twist of the tube is proportional to the true mass flow rate. The angle of twist can be determined by measuring the time difference between the instant that one side of the tube crosses a given reference plane and the instant that the opposite side crosses the same reference plane.

It is not necessary for the tube to be circular; a U-shaped tube may also be used. Mass flowmeters or mass-flow sensors using this principle are manufactured by Micro-Motion of Boulder, Colorado. The Micro-Motion instrument uses two U-shaped tubes that vibrate in opposite directions, in the manner of a tuning fork. Devices using two U-shaped tubes are described in U.S. Pat. No. 4,127,028 ("Cox, et al.") and in U.S. Pat. No. 4,252,028 ("Smith, et al.").

An instrument based on the Roth patent, or the later patents, however, behaves as a gyroscope when the base of the instrument accelerates or rotates in space. This type of motion could occur, for example, in a maneuvering aircraft. The gyroscopic behavior in the rotational environment can produce error signals that may, under certain circumstances, be nearly as large as the signals produced by the true mass flow.

SUMMARY OF THE INVENTION

The foregoing problem is obviated by the present invention, comprising:

(a) a base;

(b) an even-numbered plurality of spaced-apart, substantially identical looped conduits for carrying therethrough the fluid to be measured, each conduit secured to the base at the open end thereof in a cantilevered fashion and forming a plane at the looped end which is substantially parallel to similarly-formed planes of the other conduits and arranged, as one of a pair of conduits, for forming a tuning fork configuration with an adjacent conduit;

(c) means for directing the flow of fluid through the conduits so that the flow direction in each conduit of a respective pair arranged in a tuning fork configuration is the same, the flow direction in a respective pair of conduits arranged in a tuning fork configuration is opposite to that in an adjacent pair, and the magnitude of the flow in each conduit is substantially equal;

(d) means for oscillating the conduits perpendicular to the respective planes formed by the looped ends so that the amplitude of oscillation is substantially equal for all conduits and the phases of oscillation for all conduits are synchronized so each conduit of a respective pair arranged in a tuning fork configuration is 180 degrees out of phase with the other conduit of the respective pair, the respective first conduits of the conduit pairs are in phase with one another and the respective second conduits of the conduit pairs are in phase with one another; and (e) means for measuring the mass flow rate from the time differentials for each conduit between the crossing of one side of a respective conduit through a given reference plane and the crossing of the opposite side through the same reference plane.

The measurement produced by this instrument is insensitive to variations in the environment (in particular, motion) in which the device operates. The invention overcomes the errors due to the motion of the base of the instrument by utilizing a plurality of tubes, preferably four, arranged and operated so that the phase of the oscillation of the tubes and direction of the flow of the fluid cancel the errors due to the base motion.

BRIEF DESCRIPTION OF DRAWINGS

For a better understanding of the invention, reference is made to the following description of exemplary embodiments thereof, and to the accompanying drawings, wherein:

FIG. 7b is a schematic diagram of a computational circuit associated with the plurality of timers of FIG. 7a.

DETAILED DESCRIPTION

Figure 1:
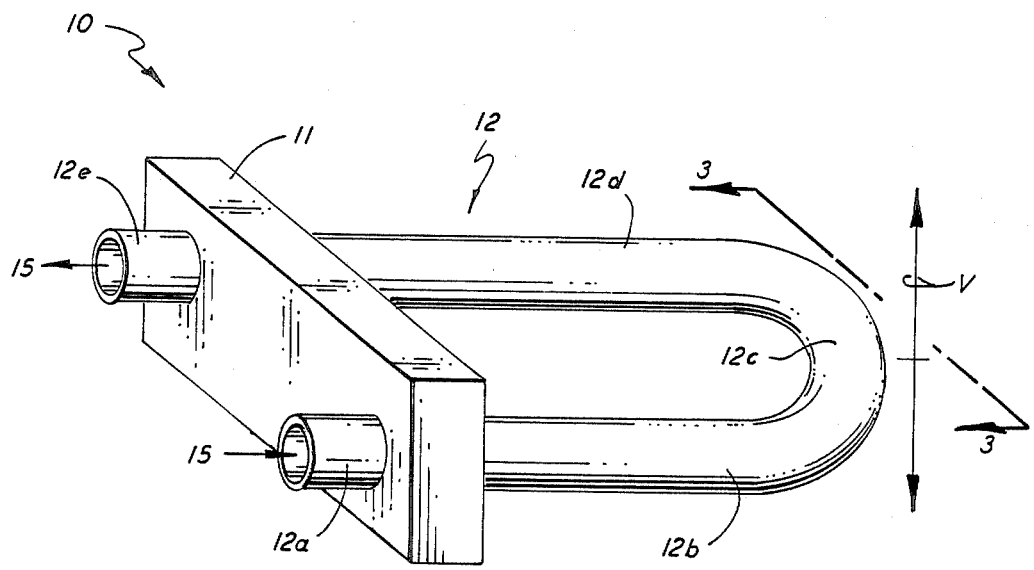
FIG. 1 is an isometric view of a prior art mass-flow sensor having a single U-shaped tube attached to a base.

FIG. 1 illustrates a prior art mass-flow sensor 10 comprising a base 11 and a single U-shaped tube 12 attached thereto. Fluid 15 flows into one free end of the U-shaped tube 12 which is a fluid inlet 12a, through a first side 12b, around the tube bend 12c, through a second side 12d and out through the other free end which is a fluid outlet 12e. Both sides 12b, 12d of the tube 12 before the inlet 12a and outlet 12e ends, respectively, pass through the base 11 which keeps the inlet 12a and outlet 12e ends separated from one another. Also note that a vibration V applied to the U-shaped tube 12 during operation is perpendicular to the plane of the U-shaped tube 12 at rest.

Figure 2:
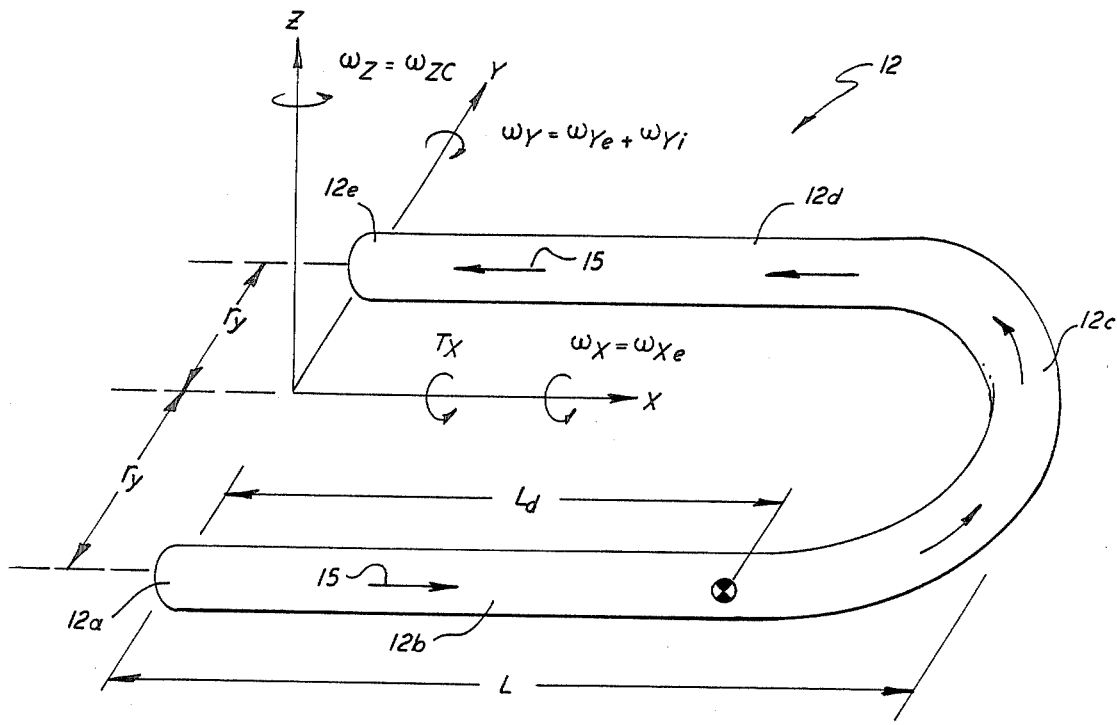
FIG. 2 is an isometric view of the U-shaped tube of FIG. 1 having a coordinate system and dimensions of the tube described.

A coordinate system (i.e., x, y, z axes) and dimensions of the U-shaped tube 12 of FIG. 1 are shown in FIG. 2. The following parameters of the tube 12 shown in FIG. 2 are defined as follows:

$w_x$, $w_y$, $w_z$: total angular velocity components of the U-shaped tube 12 about the x, y, and z axes, respectively;

$w_{xe}$, $w_{ye}$, $w_{ze}$: externally applied angular velocity components of the instrument base 11 about the x, y, and z axes, respectively;

$w_{yi}$: internally applied angular velocity (about the y axis) due to the vibration V applied to the U-shaped tube 12 during operation;

$I_x$, $I_y$, $I_z$ (not shown): moments of inertia of the U-shaped tube 12 about the x, y, and z axes, respectively;

$T_x$: total resultant torque acting upon the U-shaped tube 12 about the x axis;

v (not shown): velocity of the fluid 15 flowing in the U-shaped tube 12;

m (not shown): mass of the moving fluid 15 contained in length L of one side of the U-shaped tube 12;

$r_y$: one-half the width of the U-shaped tube 12 measured from the center lines of the inlet 12a and outlet 12e;

L: length of one side of the U-shaped tube 12; and $L_d$: distance from the base 11 to the reference point at which deflections of the U-shaped tube 12 are measured.

The total angular velocity components of the U-shaped tube 12 form the following relationships with the other parameters:

$$w_x = w_{xe}$$

$$w_y = w_{yi} + w_{ye}$$

$$w_z = w_{ze}.$$

The following assumptions are approximately valid for a practical mass-flow sensor 10:

(a) the U-shaped tube 12 behaves as a nearly-rigid body oscillating at the vibration frequency;

(b) the flow 15 inside the tube 12 is steady and one-dimensional; and (c) $I_z - I_y = I_x$.

From the foregoing, it can be shown that the total resultant torque $T_x$ acting upon the U-shaped tube 12 about the x-axis is given by the following equation:

$$T_x = -4mw_{yi}vr_y - 4mw_{ye}vr_y - I_x(w_{yi}w_z + w_{ye}w_z + dw_x/dt). \tag{1}$$

Figure 3:
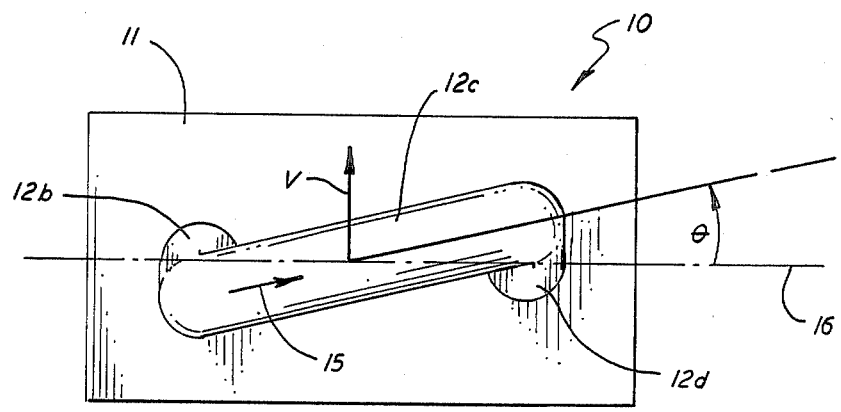
FIG. 3 is an enlarged end view of the mass-flow sensor of FIG. 1 taken along arrows 3—3 in FIG. 1.

FIG. 3 shows an end view of the mass-flow sensor 10 during operation when the vibration V is applied thereto. The applied vibration V is normal to the plane 16 of the U-shaped tube 12 at rest (as also shown in FIG. 1). Such a vibration V causes the U-shaped tube 12 to twist with the bend section 12c at some twist angle $\theta$ from its plane at rest. Assuming a linear variation of the twist of the tube 12 with applied torque according to Hooke's Law (i.e., $T_x = k\theta$, where k is a constant), it is determined from Equation (1) that:

$$\theta = (-4mw_{yi}vr_y - 4mw_{ye}vr_y - I_x[(w_{yi} + w_{ye})w_z + dw_x/dt])/k. \tag{2}$$

When the U-shaped tube 12 twists by a small angle $\theta$ as shown in FIG. 3, a reference point near the free end of the second side 12d of the tube 12 will cross the given reference plane 16 before a corresponding point on the first side 12b crosses this same reference plane 16. The reference plane 16 is defined by the plane formed by the non-twisted U-shaped tube 12 when at rest (i.e., non-vibrating). The time difference between the two crossings is given by the equation:

$$\Delta t = 2r_y\theta/V_t, \tag{3}$$

where $V_t$ is the linear velocity at the reference point on each free end due to the applied vibration V. A positive $\Delta t$ corresponds to the first side 12b crossing the reference plane 16 before the second side 12d, while a negative $\Delta t$ corresponds to the second side 12d crossing first.

The mass flow rate Q of the fluid 15 is given by the following equation:

$$Q = \rho v A = mv/L, \tag{4}$$

where A is the cross-sectional area of the tube 12, L is the length of one side of the tube 12, and $\rho$ and is the density of the fluid 15 in the tube 12. In addition, the moment of inertia of the U-shaped tube 12 about the x-axis is approximated by the equation:

$$I_x = 2mr_y^2. \tag{5}$$

Finally, for the geometry of the U-shaped tube 12 shown in FIGS. 2 and 3, $$V_t = L_d w_{yi}, \tag{6}$$

where $L_d$ is the distance from the base 11 to the reference point at which the deflections are measured (see FIG. 2).

On substitution of equations (2), (4), (5) and (6) into equation (3), the following equation is obtained:

$$\Delta t = -\frac{8r_y^2 L}{kL_d}Q - \frac{8r_y^2 w_{ye}L}{kw_{yi}L_d}Q - \frac{4mr_y^3}{kw_{yi}L_d}\left(w_{yi}w_z + w_{ye}w_z + \frac{dw_x}{dt}\right). \tag{7}$$

This expression relates the time difference to the mass flow rate Q, the internally applied angular velocity $w_{yi}$ and external angular velocity components $w_x$, $w_{ye}$, $w_z$ for the reference directions shown in FIG. 2. As noted above, a negative sign in the $\Delta t$ term indicates that the corresponding twist in the U-shaped tube 12, as shown in FIG. 3, is such that the second side 12d crosses the reference plane 16 before the first side 12b. If the fluid 15 flow direction of angular velocity directions are reversed, however, the signs of the corresponding terms must be changed.

Figure 4:
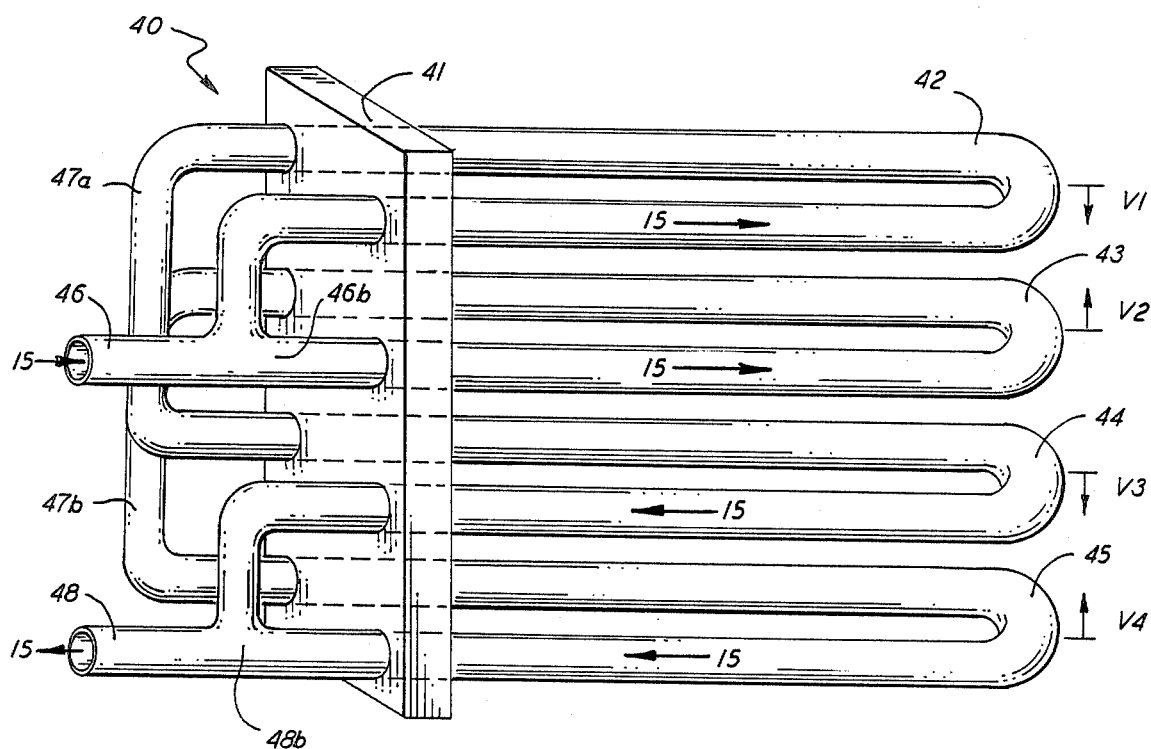
FIG. 4 is an isometric view of a first embodiment of a mass-flow measuring instrument of the present invention having four (4) U-shaped tubes arranged on an associated base.

FIG. 4 shows an isometric view of a mass-flow measuring instrument 40 of the present invention. The instrument 40 comprises a rigid base 41 and four (4) U-shaped tubes 42, 43, 44, 45 attached to the base 41 as shown. The fluid 15 flows into an inlet 46 which is split at a coupling 46b so that half of the fluid 15 goes into the first U-shaped tube 42 and half of the fluid 15 goes into the second U-shaped tube 43. The outflow of fluid 15 from the first U-shaped tube 42 is piped to an inlet 47a of the third U-shaped tube 44, with the connection being made between those two tubes so that the fluid 15 flow direction in the first U-shaped tube 42 and in the third U-shaped tube 44 are in opposite directions. Similarly, the outflow from the second U-shaped tube 43 is piped to an inlet 47b of the fourth U-shaped tube 45 so that the flow in that tube is opposite in direction to the flow in the second U-shaped tube 43. The outflows of the third and fourth U-shaped tubes 44, 45 are combined in a coupling 48b so that the total fluid 15 flow from the inlet 46 goes to the outlet 48 of the instrument 40.

The instrument 40 is constructed so that the magnitude of the fluid 15 flow in each of the four tubes is equal. The base 41 of the instrument 40 is stiff and massive to prevent any significant distortion thereof due to the motion of the U-shaped tubes. The "plumbing" between the inlet 46 and the first two U-shaped tubes 42, 43; between the outlets of these tubes and the inlets 47a, 47b to the third and fourth U-shaped tubes 44, 45; and between the outlets of the third and fourth U-shaped tubes 44, 45 and the outlet 48 of the instrument 40 are negligibly short and very stiff relative to the size and flexibility of the U-shaped tubes, so that the entire structure consisting of the base 41; the two couplings 46b, 48b; the two inlets 47a, 47b to the third and fourth U-shaped tubes 44, 45; the inlet 46 and the outlet 48 can be regarded as a single rigid body. A number of alternate means for interconnecting the four U-shaped tubes can be used as long as the required fluid 15 flow direction in each U-shaped tube is maintained and the magnitude of the fluid 15 flow in each U-shaped tube is equal. One method to guarantee equal fluid 15 flow in each U-shaped tube is to interconnect the four U-shaped tubes in sequence (i.e., the inlet 46 to the first tube 42, the first tube 42 to the second tube 43, the second tube 43 to the third tube 44, the third tube 44 to the fourth tube 45 and the fourth tube 45 to the outlet 48) while maintaining the required fluid 15 flow directions in each U-shaped tube.

Note that the fluid 15 flows in the first U-shaped tube 42 and the second U-shaped tube 43 are in the same direction, but the respective vibrations V1, V2 are out of phase. Hence, the applied angular velocity for these two tubes have opposite signs. The flows of the fluid 15 in the third tube 44 and the fourth tube 45 are in opposite directions to those of the first and second tubes 42, 43, but, the vibration V3 of the third tube 44 is in phase with the vibration V1 of the first tube 42 and the vibration V4 of the fourth tube 45 is in phase with the vibration V2 of the second tube 43. Thus, the applied velocities of the first and third tubes 42, 44 are equal and both are opposite to the equal applied velocities of the second and fourth tubes 43, 45.

Figure 5:
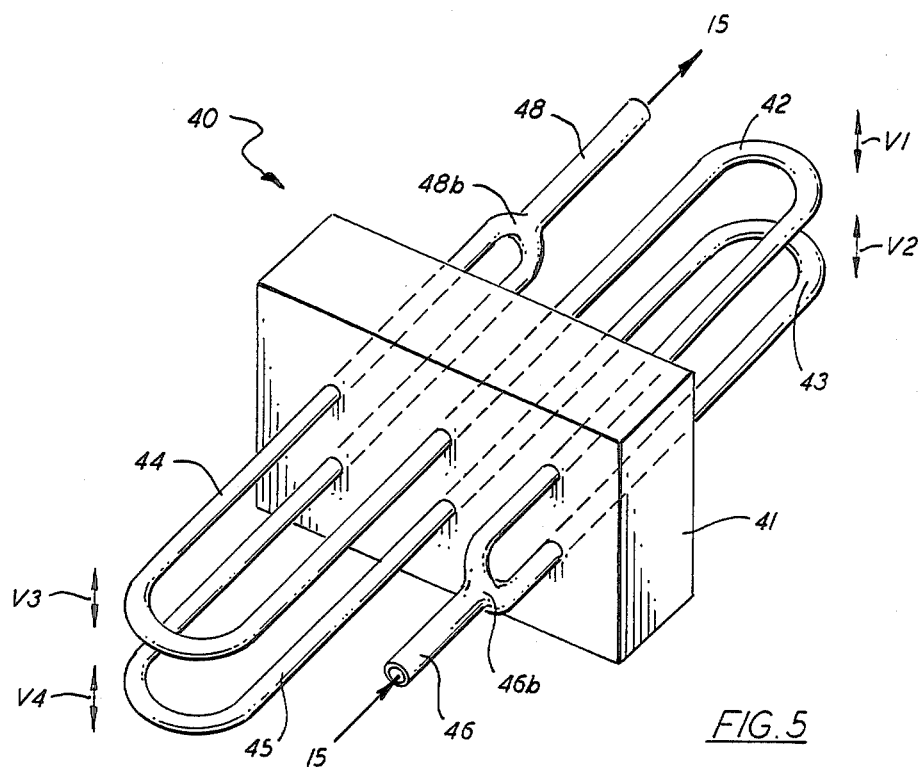
FIG. 5 is a isometric view of a second embodiment of a mass-flow measuring instrument of the present invention having four (4) U-shaped tubes arranged on an associated base.

An alternate construction of the instrument 40 is shown in FIG. 5 in which the third and fourth U-shaped tubes 44, 45 are on the opposite side of the base 41. This alternate construction eliminates the need for the "plumbing" between the first and third U-shaped tubes 42, 44 and between the second and fourth U-shaped tubes 43, 45, and permits the inlet 46 and outlet 48 directions to be parallel. But it requires a housing that is nearly twice as long as that which is needed to contain the structure shown in FIG. 4.

Suppose there are four (4) sets of sensors, one sensor set for each U-shaped tube, and arranged so that each set of sensors measures the time difference between the instant that one side of the corresponding U-shaped tube crosses the reference plane of the tube at rest and the instant that the other side crosses the same plane. Using the reference directions and dimensions shown in FIG. 2, if the first side 12b of a respective U-shaped tube crosses first, $\Delta t$ is positive; if the second side 12d crosses first, $\Delta t$ is negative. Let $\Delta t_1$, $\Delta t_2$, $\Delta t_3$ and $\Delta t_4$ denote the time difference as measured by the corresponding sets of sensors at the same instant of time for the first, second, third and fourth U-shaped tubes 42, 43, 44, 45, respectively. (Note that there are two measurements of $\Delta t$ for each U-shaped tube for each cycle of vibration.) Then, $$\Delta t_1 = -\frac{8r_y^2 L}{kL_d} Q - \frac{8r_y^2 w_{ye} L}{kw_{yi} L_d} Q - \tag{8}$$

$$\frac{4mr_y^3}{kw_{yi}L_d}\left(w_{yi}w_z + w_{ye}w_z + \frac{dw_x}{dt}\right).$$

$$\Delta t_2 = -\frac{8r_y^2 L}{kL_d} Q + \frac{8r_y^2 w_{ye} L}{kw_{yi} L_d} Q + \tag{9}$$

$$\frac{4mr_y^3}{kw_{yi}L_d}\left(-w_{yi}w_z + w_{ye}w_z + \frac{dw_x}{dt}\right).$$

$$\Delta t_3 = -\frac{8r_y^2 L}{kL_d} Q + \frac{8r_y^2 w_{ye} L}{kw_{yi} L_d} Q - \tag{10}$$

$$\frac{4mr_y^3}{kw_{yi}L_d}\left(w_{yi}w_z + w_{ye}w_z + \frac{dw_x}{dt}\right).$$

$$\Delta t_4 = -\frac{8r_y^2 L}{kL_d} Q - \frac{8r_y^2 w_{ye} L}{kw_{yi} L_d} Q + \tag{11}$$

$$\frac{4mr_y^3}{kw_{yi}L_d}\left(-w_{yi}w_z + w_{ye}w_z + \frac{dw_x}{dt}\right).$$

On adding equations (8) and (9), the following equation is obtained:

$$\Delta t_1 + \Delta t_2 = -\frac{16r_y^2 L}{kL_d} Q - \frac{8mr_y^3}{kL_d} w_z. \tag{12}$$

On adding equations (10) and (11), the following equation is obtained:

$$\Delta t_3 + \Delta t_4 = \frac{16r_y^2 L}{kL_d} Q - \frac{8mr_y^3}{kL_d} w_z. \tag{13}$$

Equation (12) subtracted from equation (13) yields one equation containing all the time differences:

$$(\Delta t_3 + \Delta t_4) - (\Delta t_1 + \Delta t_2) = \frac{32 r_y^2 L}{k L_d} Q. \quad (14)$$

It thus follows that the true mass flow rate Q can be computed using the following formula:

$$Q = (k L_d / 32 r_y^2 L) \cdot (\Delta t_3 + \Delta t_4 - \Delta t_1 \Delta t_2). \quad (15)$$

This expression is for the mass flow rate Q in one U-shaped tube. Since the total mass flow rate $Q_t$ is the sum of the mass flow rates Q of the first and second U-shaped tubes 42, 43, the value of Q in Equation (15) must be doubled to obtain the total mass flow rate:

$$Q_t = (k L_d / 16 r_y^2 L) \cdot (\Delta t_3 + \Delta t_4 - \Delta t_1 - \Delta t_2). \quad (16)$$

Figure 6A:
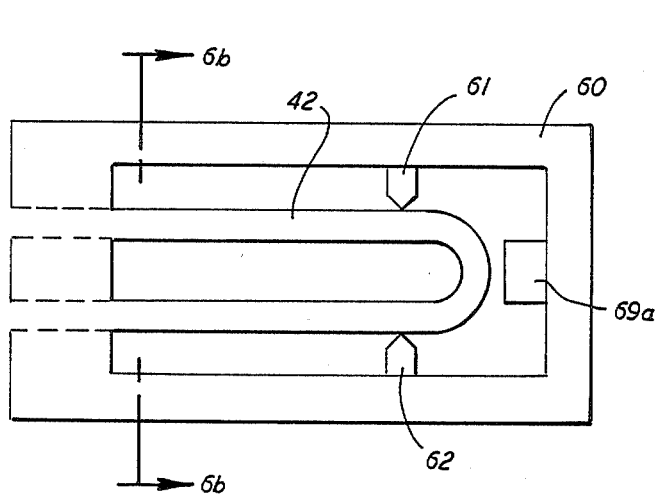
FIG. 6a is a top view of a housing in which the mass-flow measuring instrument of FIG. 4 is mounted.
Figure 6B:
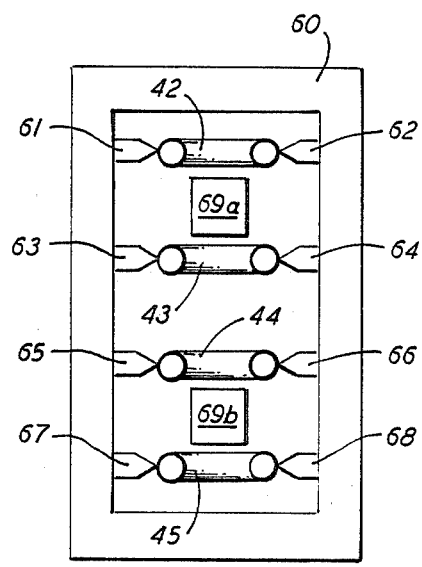
FIG. 6b is an end view of the housing of FIG. 6a taken along arrows 6b—6b.

The measurement of the time difference from a pair of sensors associated with each U-shaped tube can be accomplished by any of a number of methods (e.g., U.S. Pat. No. 4,422,338). Also, various digital means of measuring the time difference between the occurrence of two events are described in the literature of electrical engineering. FIGS. 6a and 6b illustrate one structure to measure the time differences from sensor pairs.

The instrument 40 is mounted in a housing 60, as shown in FIGS. 6a and 6b, within which are mounted eight (8) sensors 61 . . . 68 and two (2) driver/pickoff assemblies 69a, 69b. Two sensors are used with each U-shaped tube (one sensor per side) and one driver/pickoff assembly is used with each pair of U-shaped tubes. Each of the sensors is mounted on the housing 60 and detects the instant of time at which a reference point on the corresponding side of the associated U-shaped tube crosses the reference plane, defined as the plane in which the respective U-shaped tube lies when it is not in motion. Thus, the signals from the sensors 62, 64, 66, 68 along side 1 indicate the instants that side 1 of the U-shaped tubes cross through the respective reference planes, and the signals from the sensors 61, 63, 65, 67 along side 2 indicate the instants that side 2 of the U-shaped tubes cross through the same respective reference planes.

Figure 7A:
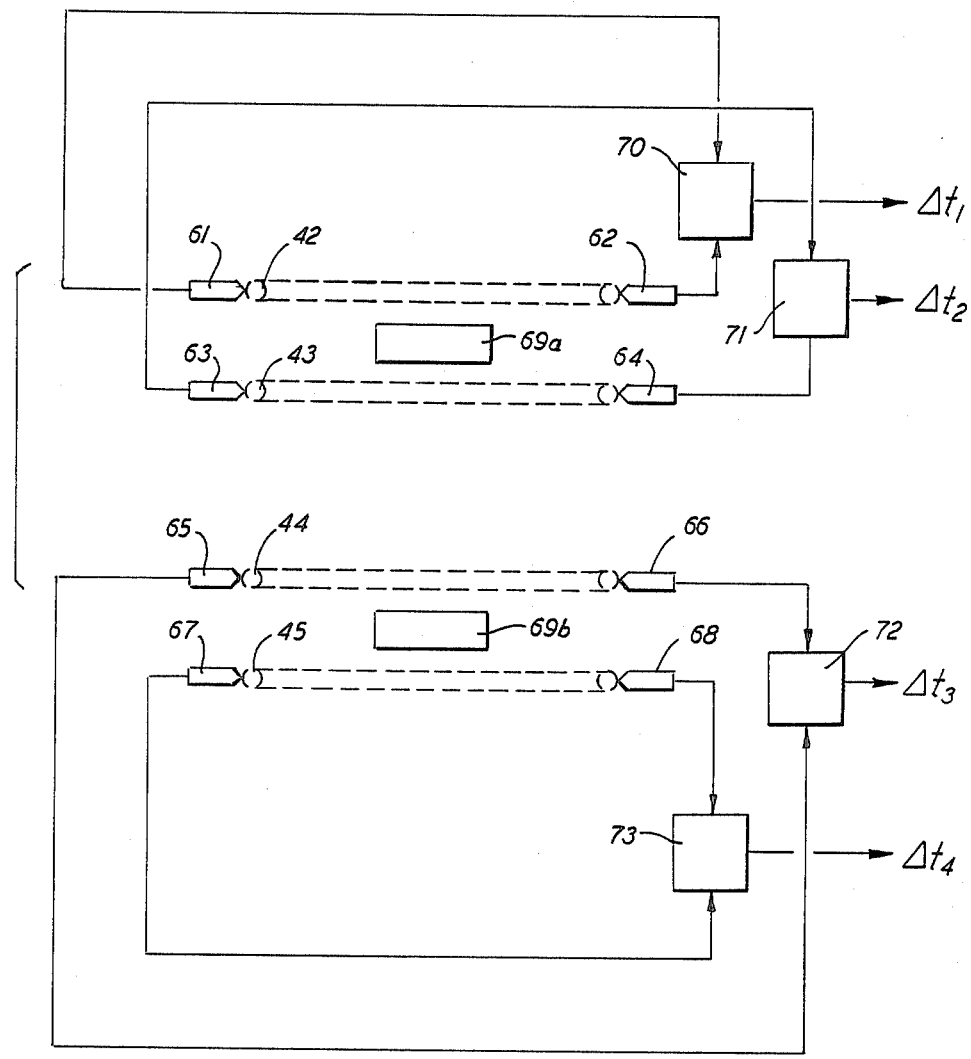
FIG. 7a is a schematic diagram of a plurality of timers associated with the housing of FIGS. 6a and 6b.
Figure 7B:
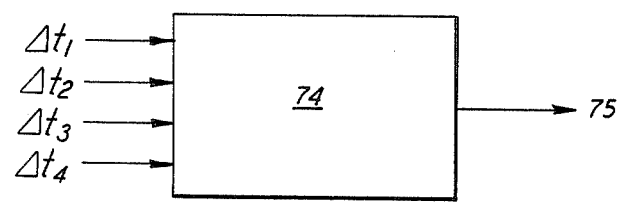

As shown in FIG. 7a, a timer 70, 71, 72, 73 is associated with each pair of sensors associated with each U-shaped tube. For each U-shaped tube, the sensor signal that occurs first starts the corresponding timer and the other sensor signal stops the same timer. The output of each timer is therefore the time difference between the instant that one side or leg of a respective U-shaped tube crosses the reference plane and the instant that the other side or leg of the same U-shaped tube crosses the same reference plane. Additional circuitry within each timer detects which sensor signal occurred first. If the sensor signal associated with side 1 of the respective tube occurs first, the time difference measurement is assigned a positive value; if the sensor signal associated with side 2 of the respective tube occurs first, the time difference measurement is assigned a negative value. Thus, the outputs of the timers 70, 71, 72, 73 are the time-difference $\Delta t_1$, $\Delta t_2$, $\Delta t_3$, and $\Delta t_4$, respectively that appear in Equation (16) from which the total mass flow rate $Q_t$ can be computed. FIG. 7b shows a computational circuit 74 that algebraically combines the time differences $\Delta t_1$, $\Delta t_2$, $\Delta t_3$ and $\Delta t_4$, in accordance with Equation (16) to produce an output 75 corresponding to the total mass flow rate $Q_t$.

A variety of sensing means can be employed to obtain a signal at the instant that a reference point on the U-shaped tube crosses the reference plane. One method is magnetic: a small permanent magnet is attached to each side of a U-shaped tube and each associated sensor (two per tube) is a small coil of wire attached to the housing 60 in which a voltage is induced when the magnet passes the sensing coil. Alternatively, the magnetic field can be produced by a permanent magnet in the associated sensors. The motion of a soft iron probe, mounted to the side of a U-shaped tube, as it passes an associated sensor will be indicated by changes in the magnetic field in the sensor. It is also possible to use optical means, for example, a light-emitting diode can be used to illuminate a reflective spot on a U-shaped tube and a photodetector can be used to detect the reflected light when the spot passes across an associated sensor.

Figure 8:
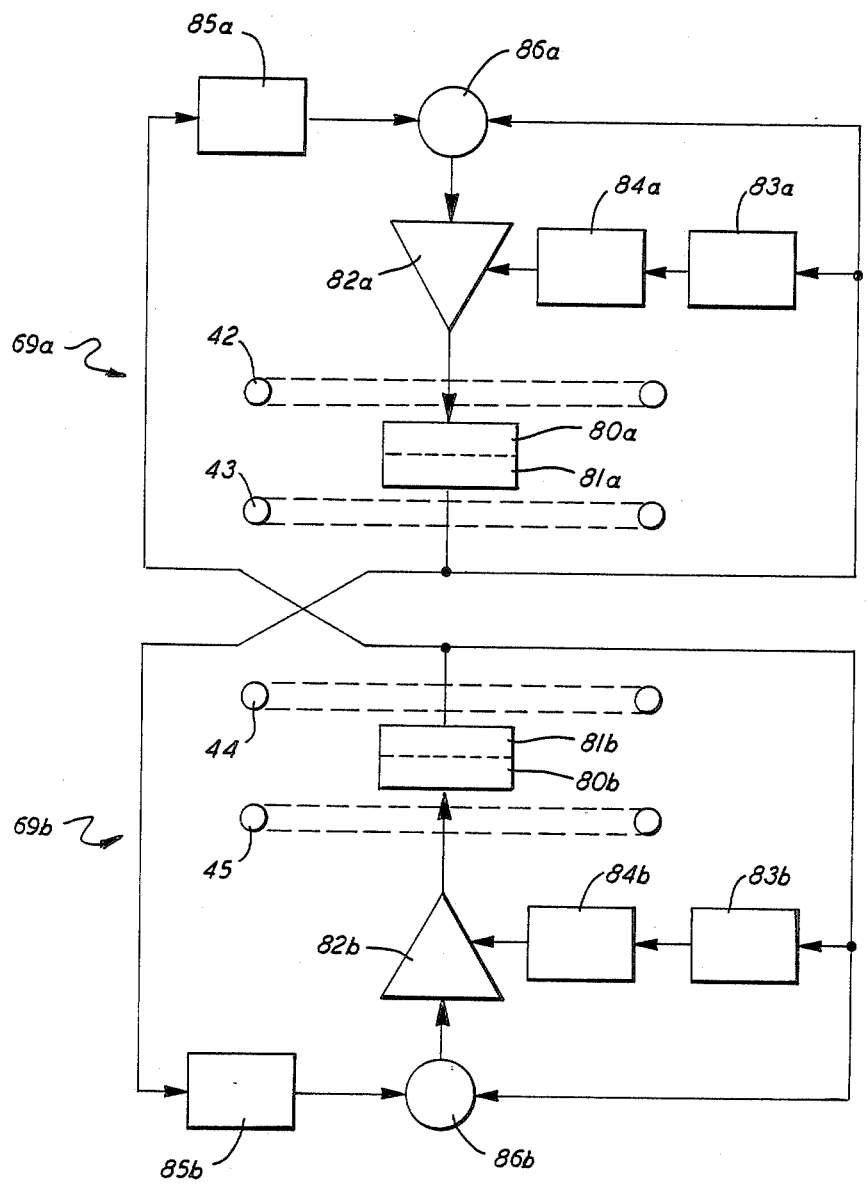
FIG. 8 is a schematic diagram of a driving mechanism which provides vibration to each pair of U-shaped tubes of the mass-flow measuring instrument of the present invention.

FIG. 8 illustrates a driving mechanism utilizing the aforementioned driver/pickoff assemblies 69a, 69b to provide sustained vibration in each pair of U-shaped tubes. To minimize the driving energy requirements, each pair of U-shaped tubes is excited in the manner of a tuning-fork and driven to oscillate at or near their natural frequency. The basic principle of operation of the instrument 40, however, does not require that each pair of U-shaped tubes be driven at the natural frequency. To maintain the oscillation at constant amplitude, each driver 80a, 80b of a respective driver/pickoff assembly 69a, 69b is operated in a feedback mode using automatic gain control ("AGC"). Combined with each driver 80a, 80b is a pickoff 81a, 81b, which measures the instantaneous position or velocity of the corresponding pair of U-shaped tubes at the point at which they are excited. The output of each pickoff 81a, 81b is fed back to its associated amplifier 82a, 82b to cause the corresponding pair of U-shaped tubes to oscillate in the manner of a turning fork. In order to control the amplitudes of oscillation so that the two pairs of U-shaped tubes oscillate at the same amplitude, the output of each pickoff 81a, 81b is also rectified and filtered by a respective rectifier and filter arrangement 83a, 83b. The d-c output of each filter 83a, 83b is used to control the loop gain by means of a respective gain control circuit 84a, 84b associated with each amplifier 82a, 82b. The electrical energy supplied to each driver 80a, 80b can be converted to mechanical energy by mounting small permanent magnets on the corresponding U-shaped tubes and constructing each driver in the form of a coil. As an alternative, piezo-electric drive mechanisms can be employed.

In order to cancel out the effects of external motion, it is necessary that the amplitudes of oscillation in all the tubes be equal. This is accomplished by the AGC loops as described above. In addition, it is necessary that the phases of oscillation of all the U-shaped tubes be synchronized: the first tube 42 must be in phase with the third tube 44; the second tube 43 must be in phase with the fourth tube 45; the second tube 43 must be 180 degrees out of phase with the first tube 42 and the fourth tube 45 must be 180 degrees out of phase with the third tube 44. The out-of-phase requirements are met by the physical construction of the instrument 40 in the form of pairs of tuning forks. The in-phase requirements are met by phase-synchronizing the two tuning fork loops. One possible implementation of this phase synchronization is shown in FIG. 8. The output of one pickoff 81a is cross-fed through a phase shift network 85b and a summing network 86b to the driver amplifier 82b of the other pair of U-shaped tubes 44, 45. Likewise, the output of the other pickoff 81b is cross-fed through a second phase shift network 85a and a second summing network 86a to the driver amplifier 82a of the first pair of U-shaped tubes 42, 43. The operation of these additional control loops is such as to force one pair of U-shaped tubes 42, 43 to oscillate in synchronism with the other pair 44, 45. The phase shift networks 85a, 85b are used to adjust the phase angles of the two cross-fed pickoff signals so that the oscillation of the first pair of U-shaped tubes 42, 43 is exactly in-phase with that of the second pair 44, 45.

Another means for establishing the in-phase requirements is to mechanically couple the first U-shaped tube 42 to the third U-shaped tube 44 by means of a connecting rod hinged to the midpoint of each U-shaped tube. Each U-shaped tube is still free to twist independently about the hinge point. The second and fourth U-shaped tubes 43, 45 are mechanically coupled by a similar means. The out-of-phase requirements are thereby met by the construction of the instrument 40 in the form of two pairs of tuning forks. The in-phase requirements are thereby met by the mechanical interconnection of these two pairs of tuning forks.

It is to be understood that the embodiments described herein are merely illustrative of the principles of the invention. Various modifications may be made thereto by persons skilled in the art without departing from the spirit and scope of the invention.

What is claimed is:

1. A device to measure the mass flow rate of a fluid from the Coriolis force resulting from the flow of the fluid through the device during oscillation thereof, comprising:
   (a) a base;
   (b) an even-numbered plurality of spaced-apart, substantially indentical looped conduits for carrying therethrough the fluid to be measured, each conduit secured to the base at the open end thereof in a cantilevered fashion and forming a plane at the looped end which is substantially parallel to similarly-formed planes of the other conduits and arranged, as one of a pair of conduits, for forming a tuning fork configuration with an adjacent conduit;
   (c) means for directing the flow of fluid through the conduits so that the flow direction in each conduit of a respective pair arranged in a tuning fork configuration is the same, the flow direction in a respective pair of conduits arranged in a tuning fork configuration is opposite to that in an adjacent pair, and the magnitude of the flow in each conduit is substantially equal;
   (d) means for oscillating the conduits perpendicular to the respective planes formed by the looped ends so that the amplitude of oscillation is substantially equal for all conduits and the phases of oscillation for all conduits are synchronized so each conduit of a respective pair arranged in a tuning fork configuration is 180 degrees out of phase with the other conduit of the respective pair, the respective first conduits of the conduit pairs are in phase with one another and the respective second conduits of the conduit pairs are in phase with one another; and
   (e) means for measuring the mass flow rate from the time differentials for each conduit between the crossing of one side of a respective conduit through a given reference plane and the crossing of the opposite side through the same reference plane.

2. The device as set forth in claim 1, wherein:
   the means for directing the flow of fluid comprises a fluid inlet coupled to both conduits of a respective first pair of conduits arranged in a tuning fork configuration, means for connecting seriatim the respective first conduits of the conduit pairs to one another, means for connecting seriatim the respective second conduits of the conduit pairs to one another, and a fluid outlet coupled to both conduits of a respective last pair of conduits arranged in a tuning fork configuration.

3. The device as set forth in claim 1, wherein:
   the means for oscillating comprises a driver/pickoff assembly for each pair of conduits arranged in a tuning fork configuration having a driver to oscillate each respective pair in the manner of a tuning fork, a pickoff which responds to the movement of each respective pair, an automatic gain control arranged in a feedback mode from the pickoff to the driver to maintain the amplitude of oscillation for each conduit substantially equal and a phase-shift network cross-feeding the driver from the respective pickoffs of the preceding and the succeeding pairs of conduits to phase-synchronize the oscillation.

4. The device as set forth in claim 1, wherein:
   the means for oscillating comprises (a) a driver/pickoff assembly for each pair of conduits arranged in a tuning fork configuration having a driver to oscillate each respective pair in the manner of a tuning fork, a pickoff which responds to the movement of each respective pair and an automatic gain control arranged in a feedback mode from the pickoff to the driver to maintain the amplitude of oscillation for each conduit substantially equal and (b) means to mechanically couple the respective first conduits of the conduit pairs to one another and the respective second conduits of the conduit pairs to one another to phase-synchronize the oscillation.

5. The device as set forth in claim 1, wherein:
   the means for measuring the mass flow rate comprises (a) means for detecting the time differential between the crossing of one side of a respective conduit through a reference plane formed by the conduit looped end when at rest and the crossing of the opposite side through the same reference plane and (b) means for deriving the mass flow rate from the time differentials of the respective plane crossings for each conduit.

6. The device as set forth in claim 1, wherein:
   the means for measuring the mass flow rate comprises (a) a pair of sensors associated with each conduit for detecting the time at which a reference point on one side of a respective conduit crosses the plane formed by the conduit looped end when at rest and the time at which a similarly-located reference point on the opposite side of the respective conduit crosses the same plane, (b) a timer associated with each sensor pair for outputting the time difference between the respective plane crossings of the two sides of a respective conduit, and (c) a computational circuit which derives the mass flow rate from the time differences outputted by all the timers.

7. A device to measure the mass flow rate of a fluid from the Coriolis force resulting from the flow of the fluid through the device during oscillation thereof, comprising:
   (a) a base;

(b) four spaced-apart substantially identical looped conduits for carrying therethrough the fluid to be measured and arranged so that the first and second conduits and the third and fourth conduits form respective tuning fork configurations, each conduit secured to the base at the open end thereof in a cantilevered fashion and forming a plane at the looped end which is substantially parallel to similarly-formed planes of the other conduits;

(c) means for directing the flow of fluid through the conduits so that the flow direction in each conduit of a respective pair arranged in a tuning fork configuration is the same, the flow direction in one pair of conduits arranged in a tuning fork configuration is opposite to that in the other pair, and the magnitude of the flow in each conduit is substantially equal;

(d) means for oscillating the conduits perpendicular to the respective planes formed by the looped ends so that the amplitude of oscillation is substantially equal for all conduits and the phases of oscillation for all conduits are synchronized so each conduit of a respective pair arranged in a tuning fork configuration is 180 degrees out of phase with the other conduit of the respective pair, the first and third conduits are in phase with each other and the second and fourth conduits are in phase with each other; and (e) means for measuring the mass flow rate from the time differentials for each conduit between the crossing of one side of a respective conduit through a given reference plane and the crossing of the opposite side through the same reference plane.

8. The device as set forth in claim 7, wherein:
the means for directing the flow of fluid comprises a fluid inlet coupled to both conduits of one pair of conduits arranged in a tuning fork configuration, means for connecting seriatim the first conduit and the third conduit, means for connecting seriatim the second conduit and the fourth conduit, and a fluid outlet coupled to both conduits of the other pair of conduits arranged in a tuning fork configuration.

9. The device as set forth in claim 8, wherein:
the means for oscillating comprises a driver/pickoff assembly for each pair of conduits arranged in a tuning fork configuration having a driver to oscillate each respective pair in the manner of a tuning fork, a pickoff which responds to the movement of each respective pair, an automatic gain control arranged in a feedback mode from the pickoff to the driver to maintain the amplitude of oscillation for each conduit substantially equal and a phase-shift network cross-feeding the driver from the pickoff of the other pair of conduits to phase-synchronize the oscillation.

10. The device as set forth in claim 9, wherein:
the means for measuring the mass flow rate comprises (a) means for detecting the time differential between the crossing of one side of a respective conduit through a reference plane formed by the conduit looped end when at rest and the crossing of the opposite side through the same reference plane and (b) means for deriving the mass flow rate from the time differentials of the respective plane crossings for each conduit.

11. The device as set forth in claim 9, wherein:
the means for measuring the mass flow rate comprises (a) a pair of sensors associated with each conduit for detecting the time at which a reference point on one side of a respective conduit crosses the plane formed by the conduit looped end when at rest and the time at which a similarly-conduit crosses the same plane, (b) a timer associated with each sensor pair of outputting the time difference between the respective plane crossings of the two sides of a respective conduit, and (c) a computational circuit which derives the mass flow rate from the time differences outputted by the four timers.

12. The device as set forth in claim 8, wherein:
the means for oscillating comprises (a) a driver/pickoff assembly for each pair of conduits arranged in a tuning fork configuration having a driver to oscillate each respective pair in the manner of a tuning fork, a pickoff which responds to the movement of each respective pair and an automatic gain control arranged in a feedback mode from the pickoff to the driver to maintain the amplitude of oscillation for each conduit substantially equal and (b) means to mechanically couple the first and third conduits to one another and the second and fourth conduits to one another to phase-synchronize the oscillation.

13. The device as set forth in claim 12, wherein:
the means for measuring the mass flow rate comprises (a) means for detecting the time differential between the crossing of one side of a respective conduit through a reference plane formed by the conduit looped end when at rest and the crossing of the opposite side through the same reference plane and (b) means for deriving the mass flow rate from the time differentials of the respective plane crossings for each conduit.

14. The device as set forth in claim 12, wherein:
the means for measuring the mass flow rate comprises (a) a pair of sensors associated with each conduit for detecting the time at which a reference point on one side of a respective conduit crosses the plane formed by the conduit looped end when at rest and the time at which a similarly-located reference point on the opposite side of the respective conduit crosses the same plane, (b) a timer associated with each sensor pair for outputting the time difference between the respective plane crossings of the two sides of a respective conduit, and (c) a computation circuit which derives the mass flow rate from the time difference outputted by the four timers.

15. The device as set forth in claim 7, wherein:
the means for oscillating comprises a driver/pickoff assembly for each pair of conduits arranged in a tuning fork configuration having a driver to oscillate each respective pair in the manner of a tuning fork, a pickoff which responds to the movement of each respective pair, an automatic gain control arranged in a feedback mode from the pickoff to the driver to maintain the amplitude of oscillation for each conduit substantially equal and a phase-shift network cross-feeding the driver from the pickoff of the other pair of conduits to phase-synchronize the oscillation.

16. The device as set forth in claim 7, wherein:
the means for oscillating comprises (a) a driver/pickoff assembly for each pair of conduits arranged in a tuning fork configuration having a driver to oscillate each respective pair in the manner of a tuning fork, a pickoff which responds to the movement of each respective pair and an automatic gain control arranged in a feedback mode from the pickoff to the driver to maintain the amplitude of oscillation for each conduit substantially equal and (b) means to mechanically couple the first and third conduits to one another and the second and fourth conduits to one another to phase-synchronize the oscillation.

17. The device as set forth in claim 7, wherein:

the means for measuring the mass flow rate comprises (a) means for detecting the time differential between the crossing of one side of a respective conduit through a reference plane formed by the conduit looped end when at rest and the crossing of the opposite side through the same reference plane and (b) means for deriving the mass flow rate from the time differentials of the respective plane crossings for each conduit.

18. The device as set forth in claim 7, wherein:

the means for measuring the mass flow rate comprises (a) a pair of sensors associated with each conduit for detecting the time at which a reference point on one side of a respective conduit crosses the plane formed by the conduit looped end when at rest and the time at which a similarly-located reference point on the opposite side of the respective conduit crosses the same plane, (b) a timer associated with each sensor pair for outputting the time difference between the respective plane crossings of the two sides of a respective conduit, and (c) a computational circuit which derives the mass flow rate from the time differences outputted by the four timers.

* * * * *